W. BALCAR.
APPARATUS FOR MANUFACTURING CHOCOLATE SWEETMEATS AND OTHER CONFECTIONERY.
APPLICATION FILED FEB. 17, 1913.
1,202,146.
Patented Oct. 24, 1916.
2 SHEETS—SHEET 1.
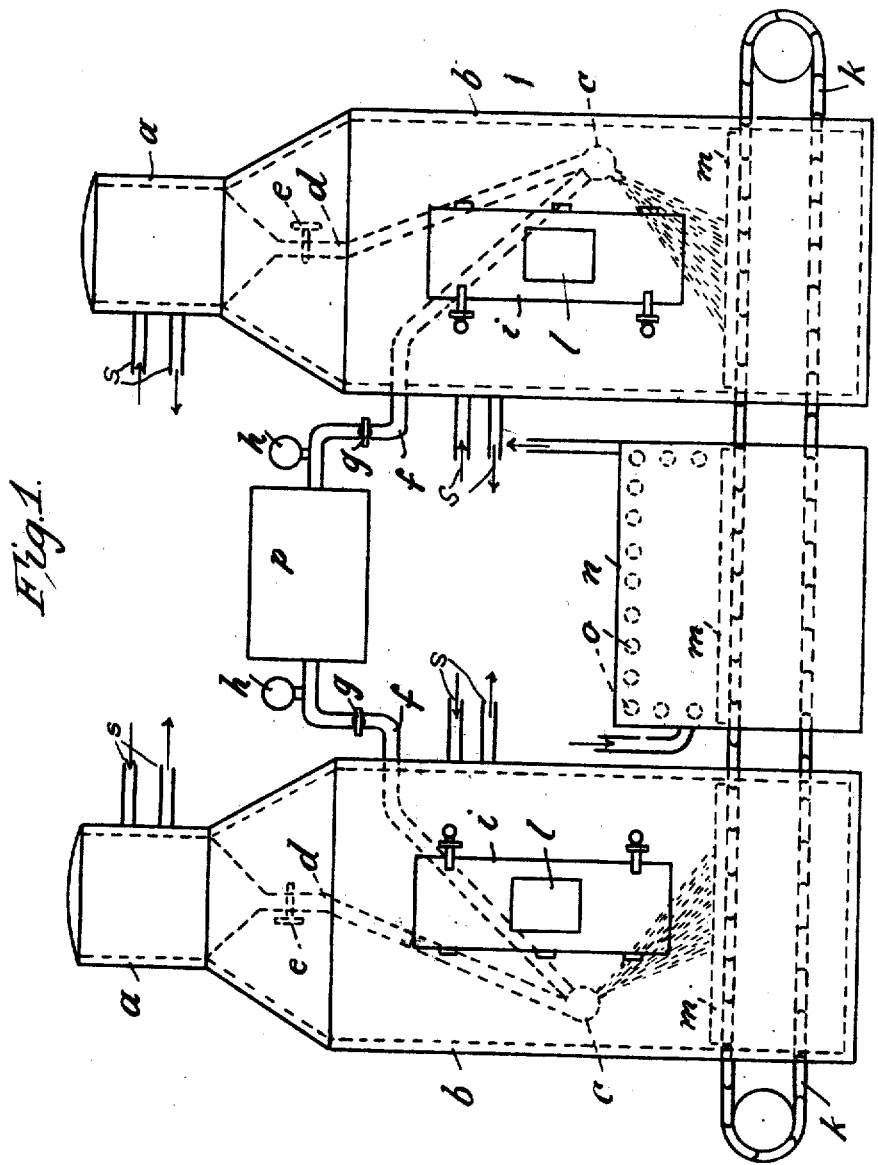
Witnesses
W. A. Williams
Floyd P. Cornwall
Inventor
Wenzel Balcar
By
Atty.

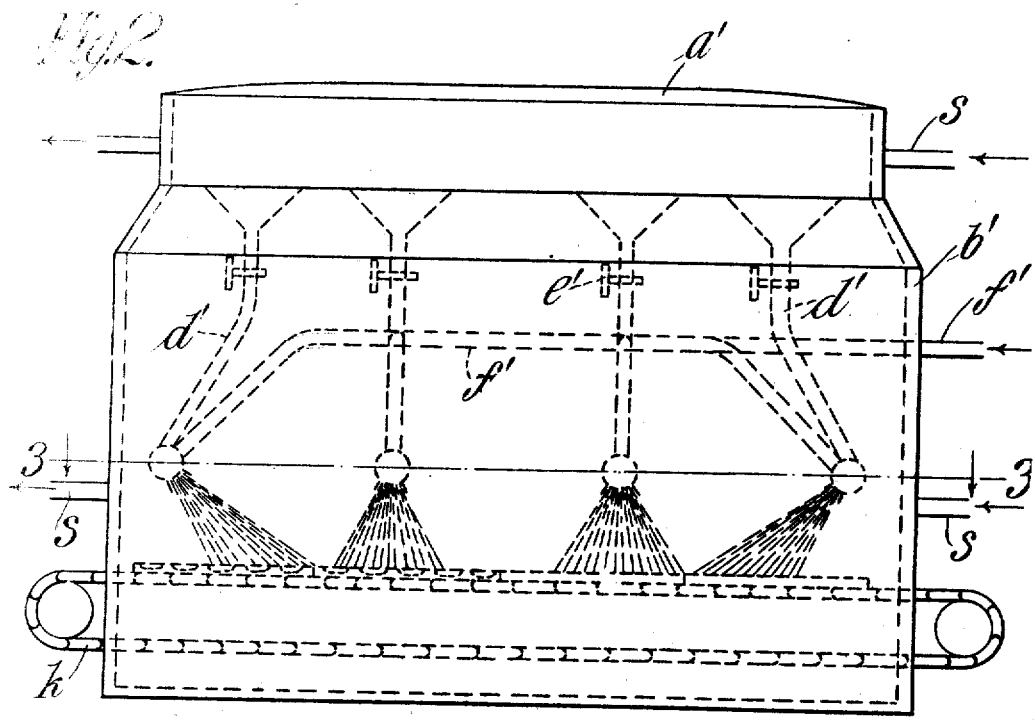
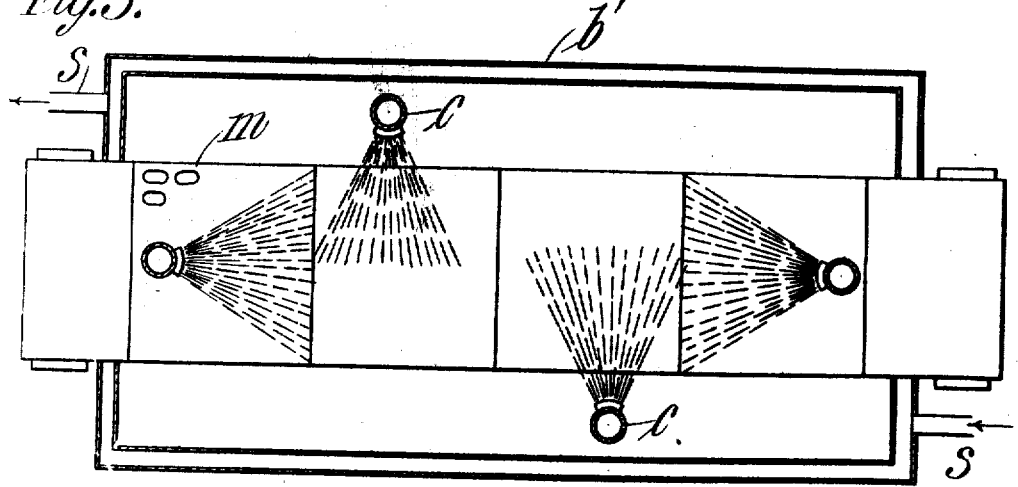
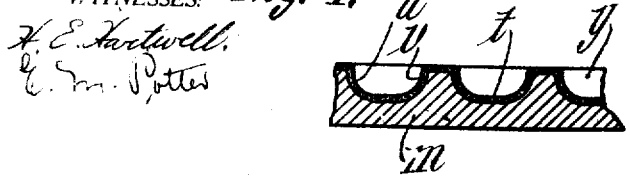
INVENTOR.
Wenzel Balcar.

UNITED STATES PATENT OFFICE.

WENZEL BALCAR, OF GYÖR, AUSTRIA-HUNGARY, ASSIGNOR, BY MESNE ASSIGNMENTS, TO NATIONAL EQUIPMENT CO., OF SPRINGFIELD, MASSACHUSETTS, A CORPORATION OF MASSACHUSETTS.

APPARATUS FOR MANUFACTURING CHOCOLATE SWEETMEATS AND OTHER CONFECTIONERY.

1,202,146.

Specification of Letters Patent.

Patented Oct. 24, 1916.

Application filed February 17, 1913. Serial No. 748,944.

*To all whom it may concern:*

Be it known that I, WENZEL BALCAR, a subject of the Emperor of Austria, residing at Györ, Kingdom of Hungary, have invented certain new and useful Improvements in Apparatus for Manufacturing Chocolate Sweetmeats and other Confectionery; of which the following is a specification.

This invention relates to an improved apparatus for manufacturing chocolate sweetmeats, such as chocolate creams, drops, etc., and particularly to manufacturing molded chocolate goods either by improved apparatus adapted to build up uniform chocolate shells on centers previously molded or by molding the chocolate shells in the improved apparatus, which shells constitute containers to receive a suitable filling either in pasty form, as a cream, or in liquid form.

The object of the invention is to provide an improved apparatus for making confectionery of the class described arranged for continuous and automatic operation and embodying the elements constructed and arranged as more particularly defined in the appended claims.

The employment of this improved apparatus renders it possible particularly to so regulate the temperature of the material and spray it on the confectionery as to insure a uniform distribution of the material without the aid of "air blasts," "shaking tables," and the like, heretofore used in chocolate coating apparatus and also to build up in recessed molds shells of chocolate in desired shapes which may be filled with any desired material as a center.

In cases where sweets, filled chocolate and other confectionery flat in shape are to be manufactured, it is sufficient to employ one sprayer which sprays the covering material on to the goods from above so that the spray descends in an approximately vertical direction. In cases however, where the molds or confectionery to be formed are high and provided with sloping or vertical sides of comparatively large dimensions, it is desirable to employ one or several heated casings in which there are arranged a plurality of sprayers pointing and consequently also spraying in different directions and in non-interfering paths. In order to allow a layer which has already been deposited on the goods to partially harden, the confectionery, before being further treated by another spraying apparatus, may be conveyed through a cooling chamber.

One form of carrying the invention into effect is shown by way of example in the accompanying drawings, which show the improved apparatus diagrammatically.

Figure 1 shows one form of the apparatus diagrammatically in elevation; Fig. 2 shows another form of the apparatus in elevation showing also the arrangement of the spraying devices, conveyer, and mold boards adapted to be contained within a heating casing, all in diagrammatic form; Fig. 3 is a plan section taken on line 3—3 of Fig. 2; and Fig. 4 is a detail sectional view of one of the mold boards showing the chocolate shells as built up in the recessed spaces of the mold board.

In the illustrated example Fig. 1 the upper part of each heated casing consists of a double walled vessel $a$ adapted to be heated by steam circulated between the spaces of the double walls of vessel $a$ and casing $b$ by means of the inlet and outlet pipes indicated by $s$ throughout the several figures. These pipes $s$ are included in any suitable steam or hot water heating system. The vessel $a$ serves for receiving the sugar or chocolate mass to be sprayed. This receptacle $a$ is adjoined by a larger double walled copper cylinder $b$ which may likewise be heated by steam. Inside this copper cylinder $b$ there is arranged a sprayer $c$ which on the one hand through the intermediary of a pipe $d$ and a valve $e$ communicates with the vessel $a$ and on the other hand communicates through a pipe $f$ provided with a valve $g$ and a manometer $h$ with a tank $p$, or other vessel containing compressed air. The copper cylinder $b$ is provided with a door $i$ having a window $l$ which door gives access to the interior of the cylinder $b$ and the sprayer $c$, and which further allows of watching the operation of the apparatus within the casing.

The lower part of each cylinder $b$ is traversed by a chain conveyer $k$ on which the goods to be treated are placed in a mold-box *m*. The chain is set in motion by suitable driving means not shown.

At the side of the first casing *b* there is arranged a cooling chamber *n* through which the chain conveyer *k* travels, and in which a low temperature is maintained by cooling coils *o*.

Next to the cooling chamber *n* there is arranged a second casing *b* which is also traversed by the chain conveyer *k*, and the sprayer *c* of which is arranged differently when compared with the sprayer provided in the first boiler, so that it sprays the material on to the goods from a different direction.

Any desired number of such heated casings and sprayers pointing in different directions may be provided, the boilers alternating with cooling chambers. In small installations the confectionery may be subjected to a repeated treatment also in the following manner:—The mold board is passed for instance a second time through the same spraying apparatus in a direction at right angles to the direction in which said mold board traversed this spraying apparatus the first time.

When the apparatus is working, the valve *e* is so adjusted that the mass drops down uniformly from the vessel *a* until it reaches the spraying valve where it is finely sprayed by the compressed air supplied by the pipe *f*, so that it is applied in the form of a fine spray to the mold or hollow chocolate article containing a liquid or solid filling, and moved past the sprayer on the endless chain *k*. By heating the cylinder *b* it is rendered possible to obtain a very fine spray which, if necessary, may traverse a comparatively long course or distance without there being any fear of the sprayed chocolate or sugar mass rapidly solidifying. By suitably adjusting the temperature, the sprayed chocolate or sugar mass may be caused to run together to form a layer, but be prevented from flowing down the sides of the mold or the support on which the confectionery is placed. If required said support containing the confectionery on to which the material in question is to be sprayed, may be kept at a suitable temperature. When the spraying has been effected in one of the casings *b*, the goods are conveyed by the chain conveyer *k* through the cooling chamber *n* and from there if necessary through a second casing *b* similar to and for the same purpose as the one described, where the confectionery, if desired, is subjected to another spray differently directed to the previous one.

In order to most efficiently cover a recessed mold, it is preferable to arrange several sprayers, in one or more heated casings, so that the chocolate or other material may be sprayed in the recessed mold from several different directions. An example of such an arrangement is shown diagrammatically in Figs. 2 and 3, in which the reference characters indicating parts corresponding to the similar parts in Fig. 1 are primed. In the drawings, four sprayers are shown arranged in one common heating chamber, and the spraying devices direct the spray in non-interfering paths and at different angles. It will be seen from this arrangement that a mold board as *m* (Fig. 4) having recessed spaces of any desired size or configuration may travel across the several spray paths and since the sprays are directed at different angles receive on all their sides *t*, *u*, *v*, and *y*, a uniform layer. In other words, a chocolate shell is built up in each recess which shell may be subsequently used as a container for pasty or liquid centers. Especially where the latter kind of center is desired, the formation of containers as outlined is of particular importance. The method heretofore used for forming chocolate covered confections involves the molding of the center first and the application of the coating or containing shell second. The present apparatus where the recessed molds are used reverses this method as the shell is first formed, and with the shell as a container one is not limited to the consistency of the center for the shell inasmuch as a liquid can be used if desired. Therefore, the present apparatus while not confined in its operation to the formation of chocolate containers, nevertheless, has peculiar advantages in that such containers can be made in a continuous and automatic manner. So far as known, this use of the apparatus is broadly new.

Having now particularly described and ascertained the nature of said invention and in what manner the same is to be performed, I declare that what I claim is:—

1. Apparatus for making confectionery, comprising, chocolate spraying devices arranged to simultaneously spray chocolate at different angles in non-interfering paths, heating means surrounding said spraying devices arranged to prevent the chocolate spray from solidifying, a mold board on which the chocolate sprays may build up confections and conveying means arranged to move said mold board across the paths of said spraying devices.

2. Apparatus for making confectionery, comprising, two chocolate spraying devices arranged to spray chocolate in non-interfering paths, a heated casing surrounding each device to prevent the chocolate spray from solidifying, a mold board adapted to receive the chocolate spray whereby confections are built up thereon, a cooling chamber, and a conveyer arranged to move the mold board, first across the path of one chocolate spray, second through the cooling chamber to solidify the chocolate on the board from the first spray, and third across the path of the other chocolate spray, whereby the confections may be built up on the mold board in the desired manner.

3. Apparatus for making confectionery, comprising, a mold board having recessed molding spaces in which confections of desired shape may be formed, chocolate spraying devices arranged to spray chocolate into the molding spaces at different angles and in non-interfering paths, whereby the chocolate may be built up directly on the several sides of the molding spaces, means surrounding the several paths of the chocolate sprays to maintain the temperature at a point to prevent the solidifying of the chocolate, and a conveyer arranged to move the mold board across the several paths of the spraying devices.

In testimony whereof I affix my signature in presence of two witnesses.

WENZEL BALCAR.

Witnesses:
 FRANZ WEIGELD,
 JOHN J. ROUTS.